(12) United States Patent
Doerne et al.

(10) Patent No.: US 10,830,299 B2
(45) Date of Patent: Nov. 10, 2020

(54) BRAKE DISC AND METHOD FOR PRODUCING SAME

(71) Applicant: Robert Bosch GmbH, Stuttgart (DE)

(72) Inventors: Stefan Doerne, Stuttgart (DE); Ilja Potapenko, Biedenkopf (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 16/099,714

(22) PCT Filed: Apr. 19, 2017

(86) PCT No.: PCT/EP2017/059291
§ 371 (c)(1),
(2) Date: Nov. 8, 2018

(87) PCT Pub. No.: WO2017/194280
PCT Pub. Date: Nov. 16, 2017

(65) Prior Publication Data
US 2019/0145474 A1    May 16, 2019

(30) Foreign Application Priority Data
May 9, 2016  (DE) ........................ 10 2016 207 876

(51) Int. Cl.
*F16D 65/10*       (2006.01)
*F16D 65/12*       (2006.01)
(Continued)

(52) U.S. Cl.
CPC .............. *F16D 65/127* (2013.01); *C23C 8/10* (2013.01); *C23C 8/36* (2013.01); *C25D 11/026* (2013.01); *C25D 11/04* (2013.01); *C25D 11/26* (2013.01); *C25D 11/30* (2013.01); *F16D 65/125* (2013.01); *F16D 65/128* (2013.01); *F16D 55/225* (2013.01); *F16D 2065/781* (2013.01);
(Continued)

(58) Field of Classification Search
CPC .... F16D 65/122; F16D 65/125; F16D 65/127; F16D 65/128; F16D 65/10
USPC ........... 188/218 A, 218 XL, 264 A, 264 AA, 188/264 C, 264 D
See application file for complete search history.

(56) References Cited

U.S. PATENT DOCUMENTS 2,873,517 A * 2/1959 Wellman ............. F16D 69/0416
                                                        419/8
3,277,985 A * 10/1966 Caskey ................. F16D 65/847
                                                        188/264 AA
(Continued)

FOREIGN PATENT DOCUMENTS

BE       1016421 A6    10/2006
BE       10146421 A6   10/2006
(Continued)

OTHER PUBLICATIONS

International Search Report corresponding to PCT Application No. PCT/EP2017/059291, dated Jul. 7, 2017 (German and English language document) (8 pages).

*Primary Examiner* — Christopher P Schwartz
(74) *Attorney, Agent, or Firm* — Maginot, Moore & Beck LLP

(57) ABSTRACT

A brake disc, in particular for a motor vehicle, includes a base disc of a first material and a wear-reducing coating of a second material. The first material is a lightweight metal and the second material is an oxide layer.

20 Claims, 4 Drawing Sheets

(51) Int. Cl.
*C25D 11/02* (2006.01)
*C25D 11/04* (2006.01)
*C25D 11/26* (2006.01)
*C25D 11/30* (2006.01)
*C23C 8/10* (2006.01)
*C23C 8/36* (2006.01)
*F16D 65/78* (2006.01)
*F16D 55/225* (2006.01)

(52) U.S. Cl.
CPC ............... *F16D 2200/003* (2013.01); *F16D 2200/0039* (2013.01); *F16D 2200/0043* (2013.01); *F16D 2250/0038* (2013.01); *F16D 2250/0046* (2013.01)

(56) References Cited

U.S. PATENT DOCUMENTS

| | | | |
|---|---|---|---|
| 5,085,295 A | | 2/1992 | Wautelet et al. |
| 5,139,118 A | * | 8/1992 | Schenk ............... F16D 65/128 |
| | | | 188/218 A |
| 5,224,572 A | * | 7/1993 | Smolen, Jr. .......... F16D 65/125 |
| | | | 188/218 XL |
| 5,613,578 A | * | 3/1997 | Moseley ............... F16D 65/125 |
| | | | 188/218 XL |
| 6,528,132 B1 | * | 3/2003 | Naerheim ............... F16D 65/12 |
| | | | 188/264 D |
| 2001/0040076 A1 | * | 11/2001 | Gross ..................... C04B 35/573 |
| | | | 188/218 XL |
| 2009/0087588 A1 | | 4/2009 | Fillion |
| 2010/0314208 A1 | * | 12/2010 | Martino ................ B22F 5/106 |
| | | | 188/218 XL |
| 2013/0333989 A1 | * | 12/2013 | Oezer ................... F16D 65/127 |
| | | | 188/218 XL |
| 2016/0215839 A1 | * | 7/2016 | Bruggen .............. C25D 11/026 |

FOREIGN PATENT DOCUMENTS

| | | |
|---|---|---|
| CN | 102965078 A | 3/2013 |
| CN | 103375513 A | 10/2013 |
| CN | 105114495 A | 12/2015 |
| CN | 105556005 A | 5/2016 |
| DE | 33 12 804 A1 | 10/1983 |
| DE | 689 01 654 T2 | 12/1992 |
| DE | 43 10 978 A1 | 10/1994 |
| EP | 0 578 927 A2 | 1/1994 |
| EP | 2 746 613 A2 | 6/2014 |
| FR | 1304241 A | 9/1962 |
| JP | H09-53672 A | 2/1997 |
| JP | 2011-21626 A | 2/2011 |
| WO | 2015/007497 A1 | 1/2015 |

\* cited by examiner

BRAKE DISC AND METHOD FOR PRODUCING SAME

This application is a 35 U.S.C. § 371 National Stage Application of PCT/EP2017/059291, filed on Apr. 19, 2017, which claims the benefit of priority to Serial No. DE 10 2016 207 876.3, filed on May 9, 2016 in Germany, the disclosures of which are incorporated herein by reference in their entirety.

The disclosure relates to a brake disc, in particular for motor vehicles, having a base disc composed of a first material and having a wear-reducing coating composed of a second material.

The disclosure furthermore relates to a braking device for a motor vehicle, having a brake disc which can be connected/is connected to a wheel and having a brake caliper, which is assigned to the brake disc and carries at least one actuable braking element.

The disclosure furthermore relates to a method for producing a brake disc of this kind.

BACKGROUND

Conventional brake systems of motor vehicles have at least one brake disc assigned to each wheel, which can be clamped between two brake pads of a brake caliper to produce a braking torque. During the clamping process, friction arises between the brake pads and the brake disc, generating heat. In this case, the heat generated is stored at least partially in the brake disc. In extreme cases, e.g. in the case of braking from high speeds, the temperature of the brake disc can reach very high values as a result, thereby potentially compromising the strength of the brake disc. Brake discs are therefore usually produced from gray cast iron, which has a high temperature stability. This relative wind furthermore generally leads to rapid cooling of the brake disc.

As an alternative, there is a known practice of producing wear-resistant brake discs which are formed as fully ceramic brake discs or gray cast iron brake discs with a hard metal layer. Brake discs of this kind are relatively expensive to produce and have the disadvantage that, owing to the different coefficients of expansion of the materials of the base disc and the wear-reducing coating, cracks can form in the coating under high temperature loads. Moreover, the brake disc is thermally stressed during the known coating processes, potentially leading to oxidation of the wear-reducing layer.

SUMMARY

The brake disc according to the disclosure has the advantage that it can be produced in a relatively advantageous way and yet offers sufficient strength and wear reduction, while the abovementioned disadvantages are nevertheless overcome. According to the disclosure, this is achieved by virtue of the fact that the first material or base disc is manufactured from a lightweight metal and that the second material or coating is an oxide layer. An oxide layer, in particular a hard anodized layer, is produced by hard anodizing, also referred to as hard anodic coating or hard coating, or by plasma electrolytic oxidation (PEO). In this case, electrolytic oxidation of the base disc takes place, giving rise to an abrasion-resistant layer on the base disc. For this purpose, the base disc is preferably dipped into an electrolyte and connected up as the anode. During this process, the surface of the base disc is oxidized, with the result that an oxide layer forms on the lightweight metal. This layer has a high wear-reducing effect and high load-bearing capacity and strength, even at high temperatures which can occur during the operation of the brake disc. In particular, this eliminates the abovementioned disadvantages in respect of different coefficients of thermal expansion. It is furthermore possible to implement the brake disc according to the disclosure at low cost.

Overall, there is the advantage here that manufacturing methods for shaping which were previously not possible for gray cast iron brake discs because the lightweight metals melted at relatively low temperatures are available for the production of the brake disc. Thus, it is possible, for example, to use casting, metal powder injection molding, 3-D printing, deep drawing or the like. A combination of these methods is also possible. Moreover, simpler processes or more accurate process control procedures can be employed in the joining processes, e.g. laser welding or ultrasonic welding, for lightweight metal brake discs. The hard anodizing for the production of the hard anodized layer converts the initial micrometers of the lightweight metal surface into a very hard and abrasion-resistant oxidation layer. At the same time, the chemical bonding of the oxide layer formed during this process to the lightweight metal substrate is very good, in particular better than with a hard metal coating on a gray cast iron brake disc. The use of an electric field in the coating process produces a continuous oxide layer, which prevents flaking or corrosion damage. The oxide layer is itself resistant to cleaning agents and has a uniform layer thickness, thereby further minimizing wear. In comparison with hard coating a gray cast iron brake disc, hard anodizing or plasma-electrolytic oxidation is economical. Intermediate layers are not necessary with hard anodizing or PEO methods.

According to a preferred development of the disclosure, it is envisaged that the lightweight metal is aluminum. As a result, an aluminum oxide layer with the abovementioned advantages is obtained in the hard anodic coating process.

As an alternative, provision is preferably made for the lightweight metal to be titanium. Moreover, it is also conceivable to produce the base disc from some other suitable lightweight metal, e.g. magnesium.

Provision is furthermore preferably made for the first material to be applied to a support body manufactured from plastic. The base disc is thus not produced from a solid casting but is of multi-part design, wherein the base disc is mounted on the support body. The base disc can be embodied as a fully cast element or as an MIM component.

According to another embodiment of the disclosure, provision is preferably made for the base disc itself to be mounted on a support body. In this case, provision is made, for example, for the base disc to be manufactured from a formed metal sheet composed of an alloy, which is/has been processed by hard anodic coating and then mounted on the support body, as described above. In particular, the support body is designed as a heat accumulator or as a support body with a high thermal conductivity.

According to a preferred embodiment of the disclosure, provision is furthermore made for the base disc or the support body to comprise a phase change material. The specific heat capacity of the brake disc is thereby increased, thus enabling the brake disc to withstand even high temperature loads during operation.

According to an advantageous development of the disclosure, provision is made for the base disc and/or the support body to have at least one chamber, in which the phase change material is arranged. In particular, the chamber is of closable or closed design, thus preventing the phase change material from escaping. In this case, it is ensured that the heat absorption capacity of the brake disc is maintained over the long term. The base disc and/or the support body expediently have a plurality of chambers containing phase change material arranged in a uniformly distributed manner over the circumference, thus ensuring that no unbalanced locations arise during the operation of the brake disc.

The braking device according to the disclosure is characterized by the embodiment of the brake disc in accordance with the disclosure. The abovementioned advantages are thereby obtained.

Provision is preferably made for at least one heat conducting element that can be brought into or is in direct contact with the brake disc to be arranged on the brake caliper. The direct contact between the heat conducting element and the brake disc ensures that heat stored or produced in the brake disc is dissipated from the brake disc via the heat conducting element. In particular, the direct contact is between the base disc and the heat conducting element. In this case, the direct contact furthermore exists particularly in a region in which the base disc is provided with the hard anodic coating in order to avoid wear.

In particular, provision is made for the heat conducting element to be a contact brush, which, in particular, is in continuous direct contact with the brake disc. For this purpose, the contact brush is preferably assigned to one face of the brake disc and is pressed axially against the face, in particular with a preloading force, thus ensuring the continuous direct contact. Heat is then dissipated from the brake disc to the heat conducting element by virtue of the rubbing contact.

As an alternative, provision is preferably made for the heat conducting element to be a rotatably mounted contact wheel, which rolls on the brake disc, in particular on one face of the brake disc. This minimizes the wear between the heat conducting element and the brake disc and ensures advantageous heat dissipation. According to a first embodiment, the heat conducting element is advantageously continuously in direct contact with the base disc. According to a second embodiment, provision is preferably made for an actuator to be assigned to the heat conducting element, said actuator feeding the heat conducting element to the brake disc when required in order to make direct contact with said disc and to dissipate heat. In particular, provision is made for the current operating temperature of the brake disc to be monitored, e.g. measured or calculated, and for the heat conducting element to be fed to the brake disc in accordance with the operating temperature determined in order to avoid overheating of the brake disc.

According to a preferred development of the disclosure, provision is made for the heat conducting element to be thermally connected to a heat sink. This enables the heat given off by the brake disc to the heat conducting element to be fed to the heat sink, with the result that the heat conducting element does not serve as an additional store of heat but rather as a heat conductor which feeds the heat produced in the brake disc to the heat sink. Continuous advantageous cooling of the brake disc is thereby ensured. The method according to the disclosure leads to a brake disc with the abovementioned advantages. According to the disclosure, provision is made, for this purpose, for a base disc composed of a lightweight metal to be supplied in a first step. The base disc is then provided with a hard anodic coating by hard anodizing. The advantages already mentioned are thereby obtained. In particular, provision is made for the base element to be manufactured from titanium or aluminum. Manufacture from magnesium is also conceivable.

Provision is furthermore preferably made for the base disc to be mounted on a support body, wherein the support body is produced, in particular, from a material with a high specific heat capacity. In particular, a phase change material is used for this purpose.

According to a preferred embodiment of the disclosure, provision is made for the base disc to be produced as a sheet-metal part and to be provided with the hard anodic coating and finally mounted on a support body or on the support body.

Further advantages and preferred features will emerge, in particular, from what has been described above and from the claims.

BRIEF DESCRIPTION OF THE DRAWINGS

The disclosure will be explained in greater detail below by means of the drawing, in which.

DETAILED DESCRIPTION

Figure 1:
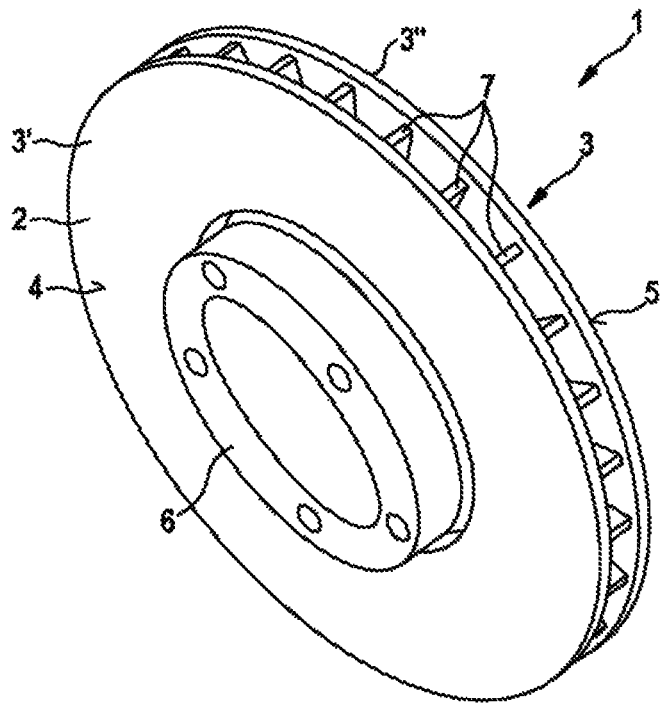
FIG. 1 shows a first illustrative embodiment of an advantageous brake disc.

FIG. 1 shows a brake disc 1 for a motor vehicle (not shown) in perspective. The brake disc 1 has a brake ring 3, which is formed by a base disc 2. The brake ring 3 has brake surfaces 4 and 5, respectively, on both faces. In the center, the brake disc 1 has a support boss 6 for fastening the brake disc 1 on a wheel bearing or a wheel of the motor vehicle. In terms of materials, the support boss 6 can differ from the brake ring and can be manufactured from aluminum, for example. This reduces the unsprung mass, and more advantageous heat dissipation to the hub and rim is achieved. A plurality of holes for screwed joints for fastening are formed on the support boss 6. The braking surfaces A, b are subject to wear during operation, leading to the necessity of replacing the brake disc 1 at regular intervals. Current brake discs are usually produced from gray cast iron and, in some cases, also from ductile cast iron or are cast from a suitable steel alloy and machined by turning. Brake discs for motorcycles are preferably manufactured from corrosion-resistant steels. In some cases, more wear-resistant ceramic brakes are also employed, although these lead to high costs. For greater braking power, higher wear resistance and better insensitivity to fading combined with low weight, silicon carbide reinforced with carbon fibers and carbon-fiber-reinforced plastic are also used for brake discs in racing and in aircraft construction. Vehicle brake discs can also be punched out of sheet metal.

The base disc 2 or brake ring 3 has two brake rings 3' and 3", which are arranged spaced apart and each form one of the braking surfaces 4 and 5, respectively. Arranged between the brake rings 3' and 3" are spacers in the form of ribs 1, which form a plurality of cavities between the brake rings 3',3". In this case, an air flow from the inside to the outside between the brake rings 3', 3" arises from the centrifugal force that occurs during driving, with the result that the brake disc 1 is actively cooled. As an option, ventilation holes can also be formed in the respective brake ring 3', 3" in order to improve the air cooling, with the air flow also passing through the ventilation holes and thereby producing turbulence which optimizes the heat transfer between the brake disc and the air.

The base disc 2 or brake rings 3', 3" and optionally also the ribs 7 are manufactured from a lightweight metal, in particular titanium, aluminum or magnesium. The braking surfaces 4, 5 are furthermore provided with an oxide layer 8, 9.

Figure 2:
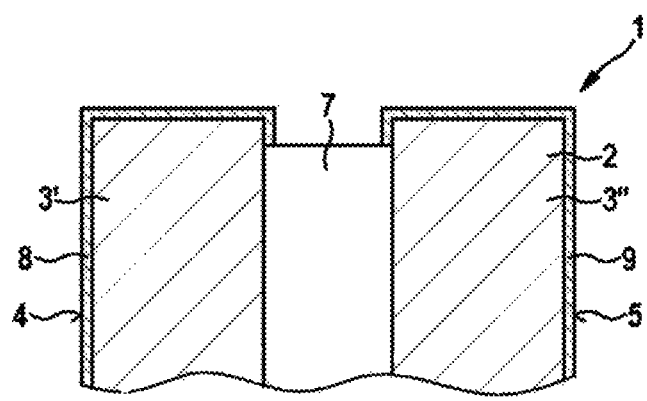
FIG. 2 shows a detail view of the brake disc.

In this regard, FIG. 2 shows an enlarged detail view of the brake disc 1 in a simplified sectional illustration. According to the illustrative embodiment under consideration, both braking surfaces 4, 5 are provided with an oxide layer 8, 9, which, in particular, extends 100 nm to 10 µm into the material of the brake rings 3', 3". In particular, the oxide layer is produced by hard anodizing or plasma electrolytic oxidation of the base disc 2 or brake rings 3', 3". If the base disc 2 is manufactured from aluminum, the braking surfaces are converted into an aluminum oxide layer or provided with such a layer by the methods mentioned.

The brake disc is produced at low cost by virtue of manufacture from a lightweight metal and, by virtue of the advantageous oxide layer, ensures low wear and high temperature stability. The formation of the wear-reducing oxide layer 8, 9 ensures optimum chemical bonding of the protective layer to the base disc 2. Moreover, the oxide layer is produced uniformly and airtightly, thus preventing corrosion of the base disc 2.

Figure 3:
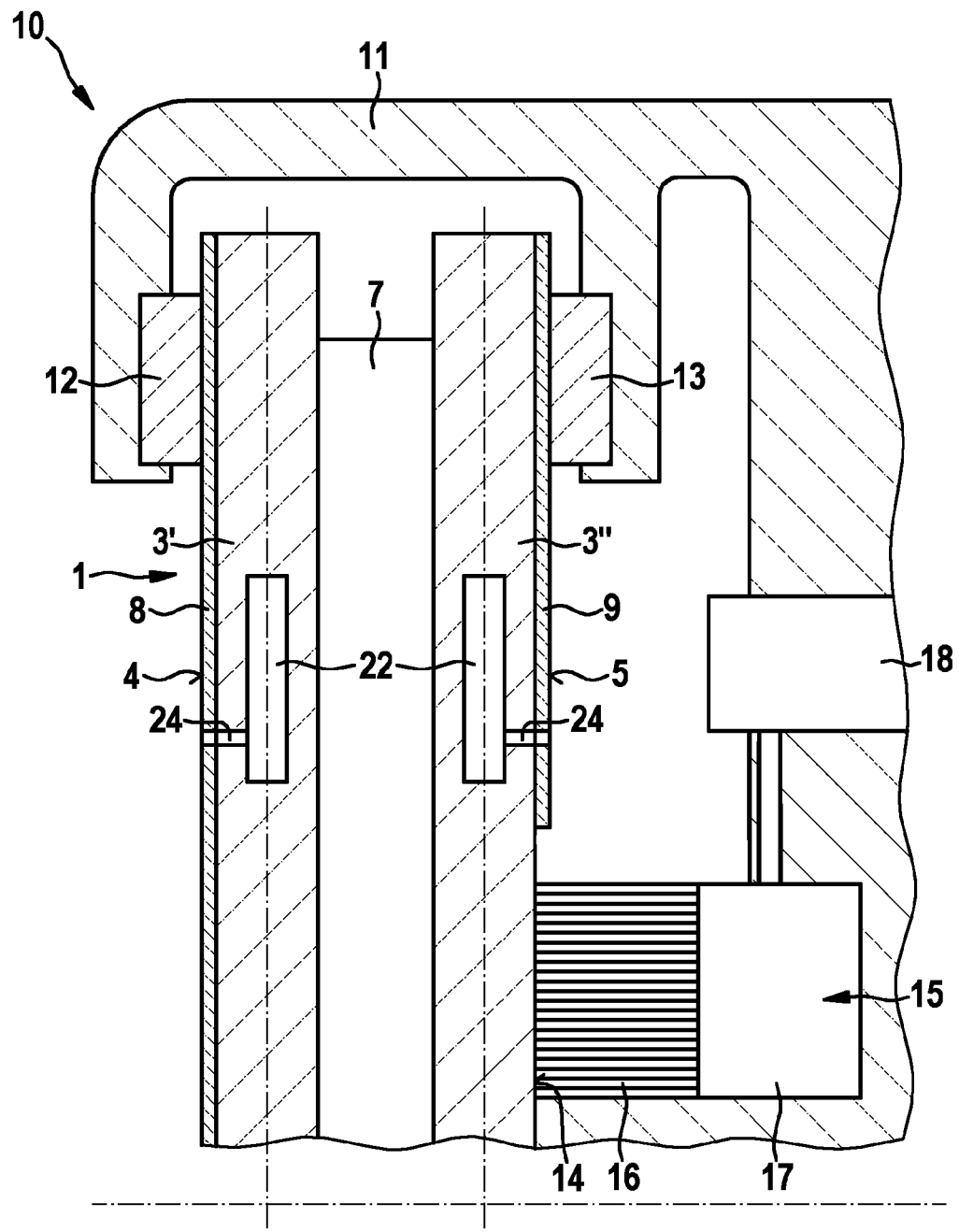
FIG. 3 shows a braking device having the brake disc.

FIG. 3 shows, in a simplified illustration, a braking device 10 which has a brake caliper 11, which has two movably mounted brake pads 12, 13, between which the brake disc 1 is situated, brake pad 12 thus being assigned to braking surface 4 having oxide layer 8, and brake pad 13 being assigned to braking surface 5 having oxide layer 9. If the brake pads 12, 13 are moved toward one another, the brake disc 1 situated therebetween is clamped between them and adhesion occurs between them, exerting a decelerating effect on the rotating brake disc 1, as with conventional braking devices.

In the present case, the inner brake ring 31' has an annular region 14 which is free from the oxide layer 9. This annular region 14 is assigned a heat conducting element 15, which in the present case is designed as a heat conducting brush 16 and is pressed against the brake disc 1 in the region of region 14 by means of a preloading force by a brush holder 17. The brush 16 is manufactured from metal and serves for heat dissipation. The heat conducting element 15 is furthermore connected to a heat sink 18, to which the heat absorbed by the heat conducting element 15 is dissipated. The heat sink 18 can be a radiator, a heat storage element or a coolant line of a cooling circuit of the motor vehicle, for example.

Region 14, which in the present case is situated radially to the inside of the oxide layer 9, can also be embodied as a groove in the brake ring 3", thereby making possible improved guidance of the heat conducting element 15. In an alternative embodiment, provision is preferably made for region 14 to be coated with a hard metal. The maximum temperature of the brake disc 1 is thus limited by the design of the direct contact between the heat conducting element 15 and the brake disc 1 and by the thermal heat dissipation to the heat sink 18.

Figure 3A:
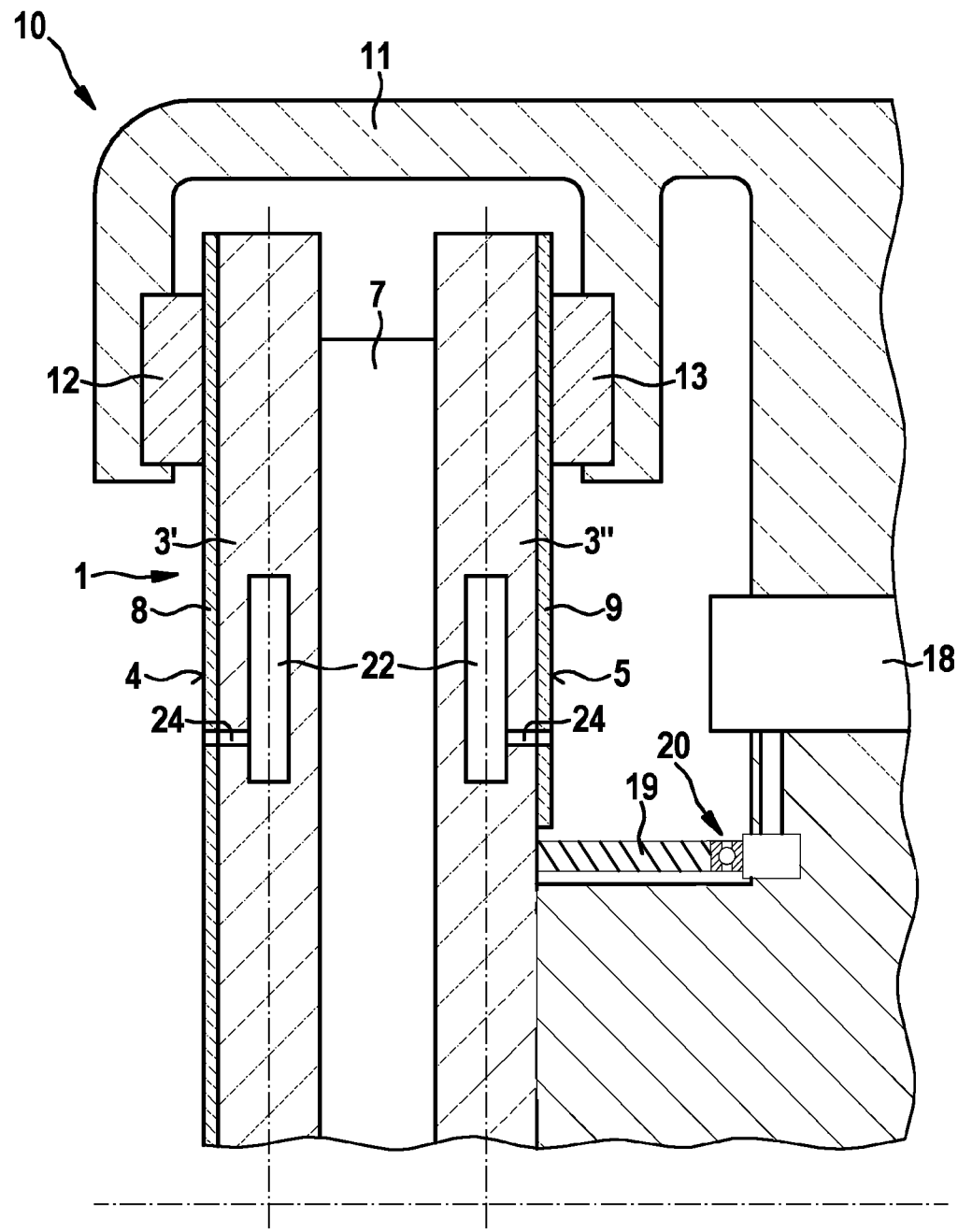
FIG. 3A shows an alternative embodiment of a braking device having the brake disc.

As an alternative to embodiment as a brush 16, provision is made, according to another illustrative embodiment shown in FIG. 3A wherein like numbers refer to like elements, for the heat conducting element 15 to be designed as a contact wheel 19, which is mounted rotatably on the brake caliper 11 by means of a bearing 20, in the present case a rolling element bearing. In this case, the bearing 20 is formed in thermal contact with the heat sink 18. Like the alternative brush 16, the contact wheel 19 is in continuous direct contact with the brake ring 3" in order to dissipate heat from the brake disc 1 to the heat sink 18 by means of the direct contact. In this arrangement, the axis of rotation of the contact wheel 19 is aligned radially with respect to the axis of rotation of the brake disc 1.

Figure 4:
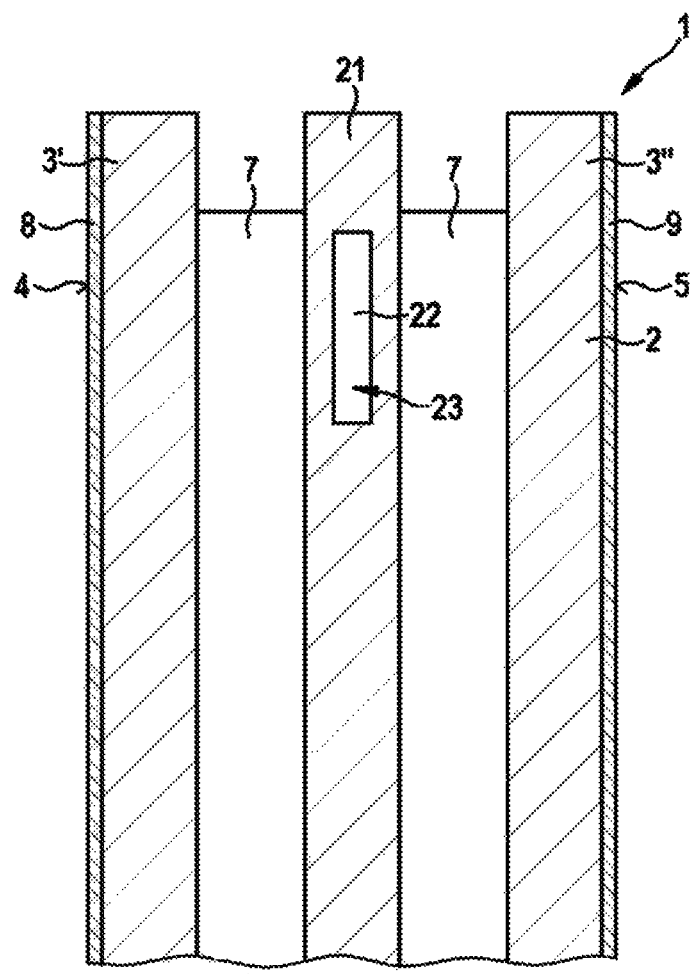
FIG. 4 shows a second illustrative embodiment of the brake disc.

FIG. 4 shows another illustrative embodiment of the brake disc 1 in a simplified sectional illustration. In contrast to the previous illustrative embodiments, provision is now made for the brake disc 1 to have a heat storage element 21. The heat storage element 21 is situated between the brake rings 3' and 3" and is connected thermally thereto. In particular, the heat storage element 21 is formed integrally with the brake rings 3', 3" and the ribs 7. In the interior, the heat storage element 21, which thus forms a heat storage ring, has one or more chambers 22, in which a material with a high specific heat capacity, e.g. oil, is arranged or held. As a particular preference, the material 23 is designed as a phase change material, e.g. a paraffin, which stores heat by changing its state of aggregation from solid to liquid, for example. Heat is thereby stored in the brake disc 1 by means of a phase change in accordance with the specific heat capacity of the phase change material, in addition to the increase in temperature, and hence thermal overloading of the brake disc 1, in particular of the brake rings 3' and 3", is avoided.

It is advantageous if the base disc 2 is manufactured by metal powder injection molding, 3-D printing and/or deep drawing, thus enabling the production of the brake disc 1 to be carried out at low cost and with little effort.

As an alternative to the illustrative embodiment under consideration, one or more such chambers 22 are formed in the brake rings 3' and 3" themselves, as shown in FIG. 3. It is also conceivable to provide additional chambers 22 in the brake rings 3' and 3" in the illustrative embodiment in FIG. 4. As already described above, the chambers 22 are filled with a material that has a high specific heat capacity and/or a phase change material. As a final step, openings 24 used to fill the chambers are closed, in particular welded.

The brake disc 1 according to the illustrative embodiments under consideration is in each case of single-part design. According to an alternative embodiment, however, provision is advantageously made for the brake disc to be of multi-part design, wherein the parts are connected to one another by suitable joining technologies, e.g. ultrasonic welding or laser welding. In particular, it is conceivable to produce the brake disc 1 in three parts, wherein parting lines are in each case preferably situated in a central plane of one of the brake rings 3' and 3", as shown by dashed lines in FIG. 3. In this way, it is also possible to produce the chambers 22 at low cost during the manufacturing process.

In order, in general terms, to improve the decrease in strength at high temperatures and the reduction in weight through the avoidance of metal mass, the maximum temperature is lowered by increasing the heat capacity C. For the same heat energy Q to be stored, this results in a lower temperature difference, i.e. a lower maximum temperature $T_{max}$. A reduction in temperature can furthermore be achieved when using phase change materials. This is explained below by means of basic physical equations:

$$\Delta T = \frac{Q}{C}$$

The heat capacity C is influenced by three parameters, the material-dependent, specific heat capacity c, the volume V and the density ρ. The latter can be combined in the weight m, although this should be kept as low as possible:

$$C = c \cdot \rho \cdot V, C = c \cdot m$$

To enable as much heat as possible to be stored with a low weight in comparison with gray cast iron brake discs, the primary choice is for a high specific heat capacity. Materials with a phase change, e.g. paraffin, are suitable for this purpose. The additional heat that can be stored in the case of a phase transition is:

$$Q = m \cdot L$$

where L is the enthalpy of melting.

The invention claimed is:

1. A braking device for a motor vehicle, comprising:
a brake disc configured to be connected to a wheel and including a brake caliper, the brake caliper assigned to the brake disc and carrying at least one actuable braking element, the brake disc further including
a base disc including a first material that is a lightweight metal, and
a wear-reducing coating including a second material that is an oxide layer; and
at least one heat conducting element configured to contact the base disc at a location spaced apart from the wear-reducing coating.

2. The braking device as claimed in claim 1, wherein:
the at least one heat conducting element is configured to be brought into direct contact with the brake disc and arranged on the brake caliper.

3. The braking device as claimed in claim 2, wherein the at least one heat conducting element is a contact brush.

4. The braking device as claimed in claim 2, wherein the at least one heat conducting element is a rotatably mounted contact wheel.

5. The braking device as claimed in claim 2, wherein the at least one heat conducting element is thermally connected to a heat sink.

6. The braking device brake disc as claimed in claim 1, further comprising:
a support body on which the base disc is mounted.

7. The braking device as claimed in claim 6, wherein the base disc and/or the support body includes a phase change material.

8. The braking device brake disc as claimed in claim 7, wherein:
the base disc and/or the support body includes at least one chamber; and
the phase change material is arranged in the at least one chamber.

9. The braking disc as claimed in claim 1, wherein the lightweight metal is aluminum.

10. The braking device as claimed in claim 1, wherein the lightweight metal is titanium or magnesium.

11. The braking device as claimed in claim 1, further comprising:
a support body on which the first material is disposed, wherein the support body is plastic.

12. The brake device according to claim 1, wherein the brake disc is connected to the wheel.

13. The brake device according to claim 1, wherein the at least one heat conducting element is mounted in direct contact with the brake disc.

14. A method for producing a braking device, comprising:
forming a base disc comprised of lightweight metal;
producing an oxide layer on a base element by hard anodizing or by plasma electrolytic oxidation; and
positioning at least one heat conducting element so as to contact the base disc at a location spaced apart from the wear-reducing coating.

15. The method as claimed in claim 14, further comprising:
manufacturing the base disc from titanium or aluminum.

16. The method as claimed in claim 14, further comprising:
mounting the base disc on a support body and/or producing the base disc as a sheet-metal part.

17. A braking device for a motor vehicle, comprising:
a brake disc configured to be connected to a wheel and including a brake caliper, the brake caliper assigned to the brake disc and carrying at least one actuable braking element, the brake disc further including
a base disc including a first material that is a lightweight metal, and
a wear-reducing coating including a second material that is an oxide layer; and
a rotatably mounted contact wheel configured to conduct heat away from the brake disc by direct contact with the brake disc, and arranged on the brake caliper.

18. The braking device as claimed in claim 17, further comprising:
a support body on which the first material is disposed, wherein the support body is plastic.

19. The braking device as claimed in claim 18, wherein the base disc and/or the support body includes a phase change material.

20. The braking device as claimed in claim 19, wherein:
the base disc and/or the support body includes at least one chamber; and
the phase change material is arranged in the at least one chamber.

* * * * *